Patented Oct. 9, 1951

2,570,391

UNITED STATES PATENT OFFICE 2,570,391

HALOGENATED SUBSTITUTED PTERIDINES

Doris R. Seeger, Bound Brook, N. J., assignor to American Cyanamid Company, New York, N. Y., a corporation of Maine No Drawing. Application March 23, 1950, Serial No. 151,539

10 Claims. (Cl. 260—251.5)

This invention relates to new organic compounds and to processes of preparing the same.

In a co-pending application, Serial Number 781,495, filed October 22, 1947, of which the present application is a continuation-in-part, are described certain pteridines in which the hydroxy group on the pyrimidine ring has been replaced with an amino group. These compounds are generally found to have an antagonistic action to pteroylglutamic acid. Among those disclosed is the 4-amino analog of pteroylglutamic acid which has extremely high antagonistic action. Other compounds disclosed, though not so powerful in their action of antagonizing pteroylglutamic acid, nevertheless may show lower acute toxicity and may, therefore, become very useful in medicine. Among these are the compounds having halogen substituents in the benzene ring.

It has been found that the substitution of the benzene ring by at least one halogen in certain compounds structurally related to pteroic acid influences their activity very considerably and makes these compounds of very great potential importance in medicine because of the fact that they tend to show folic acid antagonism in cases where the non-halogenated compounds are relatively inactive. They are thus important in medicine in an experimental capacity and possibly in the treatment of disease. These compounds may be illustrated by the following general formula:

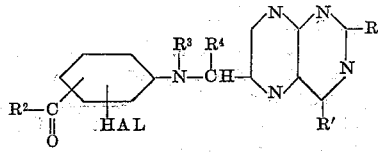

in which R and R' are hydroxyl, amino, lower alkylamino, or lower dialkylamino radicals, $R^2$ is a hydroxyl or amino acid radical, $R^3$ and $R^4$ are hydrogen and lower alkyl radicals and HAL represents at least one halogeno radical.

The new compound represented by the above formula may be prepared by reacting a 4,5-diaminopyrimidine, a halogeno aliphatic aldehyde or ketone and a halogenated primary aminobenzoic acid, a halogenated secondary alkylaminobenzoic acid or amino acid amides thereof. The reaction may be caused to take place by mixing all three of the intermediates together simultaneously, preferably in the presence of water, and after reaction thereof recovering the resulting product. It may be desirable, however, in some cases to first react the 4,5-diaminopyrimidine with the halogeno aliphatic aldehyde or ketone before adding the halogenated primary aminobenzoic acid, halogenated secondary alkylaminobenzoic acid or amino acid amides thereof to the reaction mixture or, on the other hand, to first react the halogenated primary aminobenzoic acid, halogenated secondary alkylaminobenzoic acid or amino acid amides thereof with the halogeno aliphatic aldehyde or ketone and then react the mixture with the 4,5-diaminopyrimidine.

The preferred solvent is water. However, other solvents may be used such as ethyl alcohol, acetone, benzene, carbon tetrachloride, chloroform, acetic acid and other organic liquids and mixtures thereof with each other or water. Some reaction may take place, however, by merely mixing the necessary reactants together and heating the mixture.

The reaction may take place over a wide range of temperatures of from about 0° C. up to about 100° C. or higher. Likewise, the reaction will take place over a wide range of pH conditions, best results being obtained on the acid side at a pH range of about 1.5 to 6.

The 4,5-diaminopyrimidines may be added to the reaction mixture in the form of the free base or as one of the acid salts which are usually more readily available and easier to handle than the free base. It should be noted, however, that in so far as the reaction is concerned the effective reactant is probably the ionized form of the diamine. Tautomeric forms of some of the diamines are possible, and such are not excluded from the scope of the present invention.

The preparation of many of the 4,5-vicinal diaminopyrimidines contemplated as intermediates in the process of the present invention have been described in the literature. These may be made by various processes including (1) nitrosating a suitable 4-aminopyrimidine in the 5-position and thereafter reducing the nitroso group to obtain the corresponding 4,5-diaminopyrimidine; (2) coupling a diazonium salt with a suitable 4-aminopyrimidine capable of coupling in the 5-position and thereafter reducing the azo group to an amino radical; and (3) nitrating a 4-aminopyrimidine having desired substituents on the 2 and 6-positions and thereafter reducing the 5-nitro group. By such reactions 4,5-diaminopyrimidines can be prepared having a variety of different types and kinds of radicals on the 2 and 6-positions of the pyrimidine ring. Such radicals include the amino, hydroxy, lower alkylamino, dialkylamino, etc. as shown above. Representative examples of the use of such pyrimidines are illustrated hereinafter.

Among the halogeno aliphatic aldehydes or ketones which may be used in the present process are the following: alpha,-beta-dibrompropionaldehyde; alpha,beta - dichloropropionaldehyde, 2,2,3-trichlorobutanal (butylchloral); 2,2,3-trichloropentanal; 1,1,3-trichloroacetone; 1,1,3-tribromoacetone and the like. As will be appreciated by persons skilled in the art, the corresponding acetals of the aldehydes may also be employed without modification of the essential conditions of the reaction.

The halogenated primary aminobenzoic acids and halogenated secondary alkylamino benzoic acids which may be used in the present process, in which $R^2$ is a hydroxyl radical, would include a para-aminobenzoic acid having at least one halogen in the benzene ring such as 2-chloro-4-aminobenzoic acid, 2,6-dichloro-4-aminobenzoic acid, 2,3-dichloro-4-aminobenzoic acid, 3-fluoro-4-aminobenzoic acid, etc., and also those in which one of the hydrogens on the amino group has been replaced with an alkyl radical such as 4-methylamino-3,5-dichlorobenzoic acid.

The preferred aminobenzoic acid amides are those in which $R^2$ is an amino acid radical. Particularly useful are those in which the amino acid is glutamic, aspartic, glycine, leucine, serine, phenylalanine, cysteine, isovaline, and the like. The amino acid may be natural or synthetic and may be in any of the d, l, or d,l forms. The carbonyl radicals of the amino acids may be esterified and as esters will not interfere with the essential reaction and although the reaction is not greatly effected, the nature of the biological activity of the resulting products is radically effected by the substituent.

The new compounds of the present invention may also be prepared by direct halogenation of the pre-formed pteroyl compounds (obtained by condensation of the three intermediates) which process is described in co-pending application, Serial Number 151,540, filed March 23, 1950. The process specifically described and claimed in this application is illustrated in some of the specific examples in the present application.

The process and representative compounds of the invention will now be disclosed in detail in the following examples. It will be understood, of course, that other products using intermediates mentioned hereinbefore may be prepared by the same process, the only essential difference being in the selection of the particular primary or secondary aminobenzoic acid or amides thereof employed. All parts are by weight unless otherwise indicated.

*Example 1*

A slurry of 26.6 g. of 4-aminobenzoylglutamic acid in 250 ml. of water is treated at room temperature with 32 g. of bromine added during a 10 minute period with rapid stirring. Decolorization is practically instantaneous. The mixture is stirred for an additional 10 minutes, then filtered and washed with water. This wet cake is recrystallized from 3.5 liters of hot water, and the product is obtained in fine needles. Yield, 31.4 g. of 4 - amino - 3,5 - dibromobenzoylglutamic acid, melting point 202°–203° C.

A slurry of 32.9 parts of 2,4,5,6-tetraminopyrimidine sulfate and 21.2 parts of 4-amino-3,5-dibromobenzoylglutamic acid in 700 parts of water is heated to 80° C. and treated with 40 parts of 1,1,3 - tribromoacetone. Sodium hydroxide solution is added to maintain the pH at 2.0–2.5 for one hour. The pH is then raised to 3 and the mixture cooled and filtered. Yield, 39 parts of 3',5'-dibromo-4-aminopteroylglutamic acid.

*Example 2*

32.9 parts of 2,4,5,6-tetraminopyrimidine sulfate and 21.2 parts of 3,5-dibromo-4-aminobenzoylglutamic acid are slurried with 700 parts of water at 80° C. 40 parts of tribromoacetone are added. The slurry is kept at 80° C. for an hour with the addition of caustic to maintain a pH of 2 to 2.5. The pH is then raised to 4, and the slurry is cooled and N-(3',5'-dibromo-4-[2,4-diaminopyrimido[4,5 - b]pyrazyl - 6 - methylamino]benzoyl)glutamic acid obtained as the product filtered off.

*Example 3*

To a solution of 266 parts (1 mole) para-aminobenzoylglutamic acid in 1500 parts water and 80 parts sodium hydroxide is added 130 parts ethyl chloroformate. Sodium hydroxide solution (50%) is added as necessary to maintain the solution at pH 8 to 9, and the reaction mixture is cooled as necessary to maintain the temperature at 30°–50° C. When no more sodium hydroxide is required, the solution is acidified to pH 2 to 3, and the solution is cooled to 10° C. The crystalline product is filtered, washed with cold water, and dried. There is obtained 130 g. or 40% of theory of 4-(N-carbethoxyamino)-benzoylglutamic acid. After recrystallization from water twice, the para-(N-carbethoxyamino)benzoylglutamic acid melts at 175.5°–177.5° C.

To a slurry of 68 parts (0.2 mole) 4-(N-carbethoxyamino)benzoylglutamic acid in 200 parts glacial acetic acid and 24 parts 36% hydrochloric acid is added at 20°–30° C., 16 parts chlorine gas during 15 minutes' time. The resulting clear solution is warmed to 40°–50° C. under about 100 mm. pressure to remove excess chlorine and hydrogen chloride. There is added 500 parts water, and the solution is cooled to 15° C. The solid is filtered, washed with water and dried to give 55 parts or 74% of theory of 3-chloro-4-(N-carbethoxyamino)benzoylglutamic acid. On recrystallization from water, this material melts at 165.0°–166.2° C.

A solution of 18.7 parts 3-chloro-4-(N-carbethoxyamino)benzoylglutamic acid in 80 parts by volume of 5 N sodium hydroxide is heated at 50°–60° C. for 30 minutes. On acidification to pH 3–4 with hydrochloric acid and allowing to stand there is obtained an oily precipitate which partly crystallizes. On recrystallization from water there is obtained 4.5 g. 3-chloro-4-aminobenzoylglutamic acid as white, fluffy needles. The product on further recrystallization from water melts at 150.0°–151.0° C.

A slurry of 27 parts 2,4,5,6-tetraminopyrimidine sulfate and 15 parts 4-amino-3-chlorobenzoylglutamic acid in 700 volumes of water is heated to 70° C. To this is added 36.8 parts 1,1,3-tribromoacetone. The mixture is heated at 60°–70° C. for one to two hours, with sodium hydroxide addition to maintain pH 1.8–2.0. After cooling to 20° C., 18 parts of 4-amino-3'-chloropteroylglutamic acid is filtered, washed and dried.

*Example 4*

A solution of 22 g. real 4-aminopteroylglutamic acid in 300 cc. concentrated hydrochloric acid is diluted with 300 cc. water. After cooling to 0°

C., 7.7 g. of chlorine gas is bubbled in. The mixture is cooled a little longer, filtered, and washed with 200 cc. cold dilute hydrochloric acid, and the solution treated with activated charcoal G-60, and filtered. The filtrate is diluted with water, and the mixture cooled and filtered. The cake is washed with dilute hydrochloric acid and then dissolved in 500 cc. water with ammonium hydroxide. After heating to 70° C. the thick mass is poured into 2450 cc. acetone and stirred. After cooling overnight, the ammonium salt is filtered, washed with acetone, and dried to give 17.4 g. of 3',5'-dichloro-4-aminopteroylglutamic acid.

*Example 5*

A solution of 4.4 g. real of 4-aminopteroylglutamic acid in 44 cc. concentrated hydrochloric acid is diluted with 44 cc. water, cooled to 0° C. and 3.5 g. of bromine vapor bubbled in. After filtering and washing with dilute hydrohloric acid, the cake is slurried in one liter of water and sodium hydroxide added to dissolve. The solution is treated with hydrochloric acid to pH 2-3, and the precipitate filtered off. The cake is again slurried in one liter of water and magnesium oxide added to dissolve at 60° C. After addition of activated charcoal and clarification, the filtrate is cooled and the precipitated magnesium salt filtered off and recrystallized from one liter of boiling water. On cooling the magnesium salt is filtered, washed with water and acetone, and dried. The magnesium salt of 3',5' - dibromo - 4 - aminopteroylglutamic acid weighs 2.9 g.

*Example 6*

A solution of 4.12 parts of 4-aminopteroylaminomalonic acid is prepared by heating to 50° C. with 1500 volumes 6 N hydrochloric acid and filtering off the small quantity of undissolved solid. The filtrate is cooled to 0° to 2° C., then chlorine is passed slowly into the solution until 1.4 parts has been absorbed. The solution is allowed to stand at 0° to 5° C. for twenty minutes. While maintaining the temperature below 30° C. by means of external cooling, 50% sodium hydroxide is added slowly until there was a strong spot on Congo red but no spot on methyl violet test paper. The light brown amorphous solid is filtered off at 15° C., and washed well with cold 6 N hydrochloric acid.

The wet cake is purified by dissolving in cold concentrated (36%) hydrochloric acid, and diluting with 2 volumes hot water. The material is finally isolated as a deep yellow amorphous ammonium salt by addition of acetone to its aqueous solution; yield, 1.59 parts of 3',5'-dichloro-4-aminopteroylaminomalonic acid.

*Example 7*

A sample of 4.24 parts of 4-aminopteroylisoleucine is dissolved in 63 volumes concentrated (36%) hydrochloric acid; then 42 volumes water is added, and the temperature is lowered to 5° C. To this solution at 0° to 5° C. is slowly added 1.4 parts chlorine, which causes the precipitation of some light yellow solid. This slurry is allowed to stand at 0° to 5° C. for 20 minutes, during which time more light yellow solid precipitates. Finally, 21 parts of water is added, which causes the formation of a heavy gelatinous precipitate. After standing at 0° to 5° C. for ½ hour, the solid is filtered off and washed with 50 volumes 5 N hydrochloric acid.

This material is purified as described in Example 6 above; weight of light yellow amorphous ammonium salt of 3',5'-dichloro-4-aminopteroylisoleucine, 6.3 parts.

*Example 8*

A sample of 4.10 parts of 4-aminopteroylvaline is dissolved in a solution of 168 volumes concentrated (36%) hydrochloric acid and 21 volumes water at 30° C. The temperature is lowered to 0° to 5° C. and 1.4 parts chlorine is slowly added; this causes the precipitation of a small quantity of dull yellow amorphous solid. The reaction mixture is allowed to stand 20 minutes at 0° to 5° C., then 147 volumes water is added which precipitates much more yellow solid. After standing for 30 minutes at 0° to 5° C. the solid is filtered and washed with 50 volumes 5 N hydrochloric acid.

This material is purified as described in Example 6 above; weight of deep cream colored amorphous ammonium salt of 3',5'-dichloro-4-aminopteroylvaline, 13.8 parts.

*Example 9*

To a solution of 2,5-dichloro-4-aminobenzoylglutamic acid in 280 parts by volume of solution, prepared from 6.66 parts of 2,5-dichloro-4-nitrobenzoylglutamic acid, are added 11.2 parts of 2,4,5,6-tetraminopyrimidine sulfate, 9.7 parts barium chloride, and 14.8 parts of 1,1,3-tribromoacetone. The mixture is heated to 65° C. for 1½ hours, maintaining the pH at 1.7-2 with dilute sodium hydroxide. The pH is then adjusted to 4.0 and after cooling, the light brown 2',5'-dichloro-4-aminopteroylglutamic acid is filtered off and dried. Weight, 18.6 parts.

*Example 10*

A slurry of 14 parts of 2,4,5,6-tetraminopyrimidine sulfate in 350 parts of water is treated at 80° C. with an aqueous solution of 4.3 parts of 2-chloro-4-aminobenzoic acid and 18.4 parts of 1,1,3-tribromoacetone. The mixture is stirred for one hour at 80° C. with the addition of caustic as necessary to maintain a pH of 1.8-2.0. It is then adjusted to pH 4, cooled and filtered. Yield, 8 parts of 4-amino-2'-chloropteroic acid.

*Example 11*

A solution of 4.9 g. of 9,10-dimethylpteroylglutamic acid in 44 cc. concentrated hydrochloric acid is diluted with 44 cc. water, cooled to 0° C., and 1.4 g. of chlorine bubbled in. After allowing to stand cold one-half hour, the solution is diluted with water to give, when filtered, washed and dried, 2.5 g. of 3',5'-dichloro-9,10-dimethylpteroylglutamic acid.

*Example 12*

A solution of 4.5 g. of 9-methylpteroylglutamic acid in 44 cc. concentrated hydrochloric acid is diluted wth 44 cc. water, cooled to 0° C., and bubbled in 2 g. of chlorine. To the resulting solution at 0° C. is added sodium hydroxide to about pH 3. The precipitate of 3',5'-dichloro-9-methylpteroylglutamic acid, isolated by filtration, when washed and dried, weighs 4.0 g.

*Example 13*

A solution of 4.9 g. of 4-amino-9,10-dimethylpteroylglutamic acid in 44 cc. concentrated hydrochloric acid is diluted with 44 cc. water, cooled to 0° C. and 1.4 g. of chlorine bubbled in. After standing cold for 10-15 minutes, the solution is diluted with water and neutralized to about pH 3-4 with sodium hydroxide. The precipitate of 3',5'-dichloro-4-amino-9,10-dimethylpteroylglutamic acid, after filtering and washing and drying, weighs 3.2 g.

Example 14

A slurry of 5.4 parts of 2,4,5,6-tetraminopyrimidine sulfate and 2.2 parts of 4-methylamino-3,5-dichlorobenzoic acid in 140 volumes of water is heated to 40° C. At pH 2.5–3.0 a solution of 3.6 parts of 2,2,3-trichlorobutyraldehyde in 5 volumes of acetic acid is added slowly over a 20-minute period. Dilute sodium hydroxide is added simultaneously to maintain the pH. After stirring 20 minutes longer, the mixture is filtered, washed and dried to give 5.3 parts of 4-amino-3',5'-dichloro-9,10-dimethylpteroic acid.

Example 15

A slurry of 5.11 parts 2,4,5-triamino-6-hydroxypyrimidine sulfate and 2.2 parts 4-methylamino-3,5-dichlorobenzoic acid in 140 volumes of water is heated to 40 C. At pH 2.5–3.0 a solution of 3.6 parts 2,2,3-trichlorobutyraldehyde in 5 volumes of acetic acid is added slowly over a 20 minute period. Dilute sodium hydroxide is added simultaneously to maintain the pH. After stirring 20 minutes longer, the mixture is filtered, washed and dried to give 3.4 parts of 3',5'-dichloro-9,10-dimethylpteroic acid.

Example 16

A slurry of 11.2 parts of 2,4,5,6-tetraminopyrimidine sulfate and 8.5 parts of 4-amino-3,5-dibromobenzoylglutamic acid in 280 parts of water is treated at 80° C. with 8.8 parts of butyl chloral. The mixture is stirred for ½ hour at 80° C. with the addition of caustic as necessary to maintain a pH of 1.8–2.0. It is then adjusted to pH 4, cooled and filtered. Yield, 12.1 parts of 4-amino-9-methyl-3',5'-dibromopteroylglutamic acid.

Example 17

A slurry of 6.4 parts of 2,4,5-triamino-6-hydroxypyrimidine sulfate and 3.75 parts of 4-amino-3-chlorobenzoylglutamic acid in 175 parts of water is treated at 80° C. with 5.5 parts of butyl chloral. The mixture is stirred for ½ hour at 80° C. with the addition of caustic as necessary to maintain a pH of 1.8–2.0. It is then adjusted to pH 3, cooled and filtered. Yield, 4.8 parts of 9-methyl-3-chloropteroylglutamic acid.

Example 18

A slurry of 7 parts of 2,4,5,6-tetraminopyrimidine sulfate and 6.1 parts of barium chloride dihydrate in 175 parts of water is heated at 60° C. for 10 minutes, then cooled to 45° C. It is treated with 3.75 parts of 4-amino-3-chlorobenzoylglutamic acid and the pH is adjusted to 3. During a period of 20 minutes, a solution of 4.4 parts of butyl chloral in 10 parts of glacial acetic acid is added along with caustic as necessary to maintain a pH of 2.8–3.0. The mixture is then stirred for an additional ½ hour at 45° C. and pH 3. It is then adjusted to pH 4, cooled and filtered. Yield, 10.5 parts of 4-amino-9-methyl-3'-chloropteroylglutamic acid.

Example 19

A slurry of 10.3 parts of 2,4,5-triamino-6-hydroxypyrimidine sulfate and 8.5 parts of 4-amino-3,5-dibromobenzoylglutamic acid in 280 parts of water is treated at 80° C. with 8.8 parts of butyl chloral. The mixture is stirred for ½ hour at 80° C. with the addition of caustic as necessary to maintain a pH of 1.8–2.0. It is then adjusted to pH 3, cooled and filtered. Yield, 13.6 parts of 9-methyl-3',5'-dibromopteroylglutamic acid.

Example 20

A slurry of 12.8 parts of 2,4,5-triamino-6-hydroxypyrimidine sulfate in 350 parts of water is treated at 80° C. with an aqueous solution of 4.3 part of 2-chloro-4-aminobenzoic acid and 11 parts of butyl chloral. The mixture is stirred for ½ hour at 80° C. with the addition of caustic as necessary to maintain a pH of 1.8–2.0. It is then adjusted to pH 3, cooled and filtered. Yield, 6.0 parts of 9-methyl-2'-chloropteroic acid.

Example 21

A slurry of 14 parts of 2,4,5,6-tetraminopyrimidine sulfate in 350 parts of water is treated at 80° C. with an aqueous solution of 4.3 parts of 2-chloro-4-aminobenzoic acid and 11 parts of butyl chloral. The mixture is stirred for ½ hour at 80° C. with the adition of caustic as necessary to maintain a pH of 1.8–2.0. It is then adjusted to pH 4, cooled and filtered. Yield, 5.1 parts of 4-amino-9-methyl-2'-chloropteroic acid.

Example 22

Five parts of 2,5-dichloro-4-nitrotoluene is slurried in 15 parts by volume of 80% sulfuric acid and heated to 65° C. 9.3 parts of finely pulverized potassium dichromate is slowly added, maintaining the temperature at 65° C. Heating is continued for one hour after the addition is complete, after which it is diluted with an equal volume of water and filtered. The precipitate is taken up in 140 parts of water and heated to 60° C., folowed by neutralizing with sodium carbonate to a spot on phenolphthalein. The mixture is cooled and filtered from unreacted starting material. The filtrate is neutralized with hydrochloric acid to approximately pH 2, cooled, and the white product isolated. Upon recrystallization from dilute alcohol it melts at 207°–210° C.

0.5 part of 2,5-dichloro-4-nitrobenzoic acid is mixed with 1.7 parts of thionyl chloride and a small amount of dry pyridine. The mixture is heated under reflux until complete solution is obtained (approximately ½ hour). The excess thionyl chloride is distilled off under vacuum, yielding a crystalline residue. This is purified by recrystallization from naphtha, yielding cream colored needles of 2,5-dichloro-4-nitrobenzoyl chloride, melting at 62°–64° C.

8.3 parts of glutamic acid is dissolved in a solution of 4.53 parts of sodium hydroxide in 28 parts of water. This is cooled to 15° C., and 14.4 parts of 2,5-dichloro-4-nitrobenzoyl chloride is slowly added, with stirring. The temperature is maintained at 15° C. during this period, and dilute sodium hydroxide solution is added as needed to keep a strong spot on phenolphthalein test paper. Stirring is then continued for ½ hour at 15°–25° C., after which the mixture is momentarily heated to 70° C. to complete the reaction. It is cooled and filtered from insoluble material, and the filtrate neutralized with concentrated hydrochloric acid to pH 2 or below. A white precipitate of 2,5-dichloro-4-nitrobenzoylglutamic acid is formed, which is filtered off and dried in vacuo. This is then purified by dissolving in hot water, from which it precipitates as a gel on cooling. On drying, this melts at 182°–185° C.

3.33 parts of 2,5-dichloro-4-nitrobenzoylglutamic acid is slurried in 50 parts of water and dissolved by the addition of dilute sodium hydroxide. It is then reprecipitated with acid, and 16 parts of alcohol added to increase the solubility. To a solution of 0.384 part of copper sulfate in 10 parts of water is added 3.25 parts of powdered zinc. After stirring this a few minutes, the zinc-copper couple is slowly added to the first mixture at 30°–35° C., adding concentrated hydrochloric acid as needed to maintain a blue-black spot on Congo red paper. After the addition is complete, the mixture is stirred at 30°–35° C. for an additional ½ hour, after which it is filtered from the zinc residue. A sample of the filtrate, containing the 2,5-dichloro-4-aminobenzoylglutamic acid, is titrated vs. sodium nitrite to determine the presence of free amine, and it is found that the reduction is substantially complete. The solution is diluted to 140 parts by volume and used as such in the subsequent reactions.

To the above described 2,5-dichloro-4-aminobenzoylglutamic acid in 140 parts by volume of solution are added 5.1 parts of 2,4,5-triamino-6-hydroxypyrimidine sulfate and 4.85 parts of barium chloride. This is heated to 45° C. and the pH adjusted to 3. A solution of 3.6 parts of butyl chloral in 4 parts of glacial acetic acid is then added dropwise over a twenty-minute period, maintaining the pH at 3 with dilute sodium hydroxide. Heating is continued for ½ hour, after which the mixture is cooled and the tan 2',5'-dichloro-9-methylpteroylglutamic acid filtered off. After drying this weighs 8.1 parts.

*Example 23*

This reaction is carried out exactly like the above described 2',5'-dichloro-9-methylpteroylglutamic acid preparation, except that 5.6 parts of 2,4,5,6-tetraminopyrimidine sulfate is used in place of the triamine. The 2',5'-dichloro-4-amino-9-methylpteroylglutamic acid is isolated at pH 4, and weighs 8.2 parts after drying.

*Example 24*

A solution of 5 g. of 4-amino-10-methylpteroylglutamic acid in 44 cc. concentrated hydrochloric acid is diluted with 44 cc. water, cooled to 0° C., and 1.4 g. of chlorine bubbled in. After standing 10–20 minutes, 88 cc. of water is added. To the cooled solution is added sodium hydroxide to pH 3–4. The gummy solid is cooled one and a half hours longer, filtered, washed with water and dissolved in 100 cc. acetic acid. The solution is treated with activated charcoal, clarified, and diluted with 400 cc. of water and cooled. The precipitate of 3',5'-dichloro-4-amino-10-methylpteroylglutamic acid, which is filtered, washed with water and acetone, and dried, weighs 2.1 g.

*Example 25*

A solution of 4.9 g. of 10-methylpteroylglutamic acid in 44 cc. concentrated hydrochloric acid is diluted with 44 cc. water and cooled to 0°–5° C. About 1.4 g. of chlorine is bubbled in, and the solution allowed to stand 15–20 minutes. It is then diluted with 88 cc. water and sodium hydroxide added to about pH 2–3. The gum which precipitates gradually solidifies on cooling for one hour. The material is filtered, washed with water and dissolved in 230 cc. boiling acetic acid. The solution is treated with activated charcoal and clarified. To the filtrate is added 500 cc. hot water. After cooling overnight, the precipitate of 3',5'-dichloro-10-methylpteroylglutamic acid, which is filtered, washed with water and dried, weighs 3.6 g.

*Example 26*

A solution of 4.52 parts of 4-methylaminobenzoic acid in 45 volumes of glacial acetic acid is heated at 40°–50° C. and a solution of 4.5 parts of sulfuryl chloride in 80 volumes of acetic acid is added dropwise. The heating is continued at 50°–60° C.; then the mixture is cooled and filtered. The cake is dissolved in water, whereby the free base crystallizes out and is filtered off. This is recrystallized from 80 parts of 50% alcohol. Weight, 1.9 parts, melting point 187.5°–192.0° C.

A slurry of 5.4 parts of 2,4,5,6-tetraminopyrimidine sulfate and 2.2 parts 4-methylamino-3,5-dichlorobenzoic acid in 140 volumes of water is heated to 50° C. To this is added 7.36 parts 1,1,3-tribromoacetone. The mixture is heated at 60°–70° C. for one to two hours, with sodium hydroxide addition to maintain pH 1.8–2.0. After cooling to 20° C., 4.0 parts of 4-amino-3',5'-dichloro-10-methylpteroic acid is filtered, washed and dried.

*Example 27*

Two parts of 4-(1-piperidyl)pteroylglutamic acid is dissolved in 17.5 parts of concentrated hydrochloric acid. To this is added 14.7 parts of water, and the mixture is cooled to 0° C. Chlorine gas is then bubbled in until the weight of the mixture has increased by 0.4 part. Cooling is continued for one hour, and the precipitate is then filtered off. It is then dissolved in hot water, filtered from an insoluble gum, neutralized to pH 3, cooled, and the precipitate of 3',5'-dichloro-4-(1-piperidyl)pteroylglutamic isolated.

*Example 28*

A solution of 1.76 g. real 2-dimethylamino-4-aminopteroylglutamic acid in 25–30 cc. concentrated hydrochloric acid and 25 cc. 5 N hydrochloric acid is cooled to 0° C. and 0.6 g. of chlorine gas bubbled in. After standing 10–15 minutes cold, 50 cc. water is added and cooling continued. The yellow solid is filtered and dissolved in warm water. Sodium hydroxide is added to the solution to pH 3–4. The mixture is cooled, filtered and the precipitate of 3',5'-dichloro-2-dimethylamino-4-aminopteroylglutamic acid, dried, weighs 1.24 g.

*Example 29*

A slurry of 30.8 parts of 2,4,5-triamino-6-hydroxypyrimidine sulfate and 29.3 parts of barium chloride dihydrate in 450 parts of water is heated at 60° C. for 10 minutes, then cooled to 40° C. and held at this temperature throughout the reaction. An aqueous solution of 8.55 parts of 2-chloro-4-aminobenzoic acid is added and the pH adjusted to 3. During 15 minutes, an acetic acid solution of 21.7 parts of 2,3-dibromopropionaldehyde is added simultaneously with an aqueous solution of 12.7 parts of iodine and 25 parts of potassium iodide and 5 N sodium hydroxide solution as necessary to maintain a pH of 3. The mixture is stirred for an additional 30 minutes at 40° C. and pH 3 and is then cooled and filtered with 5 parts of diatomaceous earth. A yield of 57 parts of 2'-chloropteroic acid is obtained.

*Example 30*

In an experiment similar to Example 29 in which 3-chloro-4-aminobenzoylglutamic acid is used in place of 2-chloro-4-aminobenzoic acid, 3-chloropteroylglutamic acid is obtained.

Example 31

A slurry of 8.7 parts of 2,4,5-triamino-6-hydroxypyrimidine sulfate and 8.3 parts of barium chloride dihydrate in 170 parts of water is stirred at 60° C. for 10 minutes, then cooled to 40° C. and held at this temperature throughout the reaction. 6 parts of 4-amino-3,5-dibromobenzoylglutamic acid are added and the pH adjusted to 3. During 45 minutes, an acetic acid solution of 3.1 parts of 2,3-dibromopropionaldehyde is added simultaneously with a solution of 3.6 parts of iodine and 7.1 parts of potassium iodide in 23 parts of water and 5 N sodium hydroxide solution as necessary to maintain a pH of 3. The mixture is stirred for an additional 45 minutes at 40° C. and pH 3, and is then cooled and filtered with 3 parts of diatomaceous earth. A yield of 21 parts of 3',5'-dibromopteroylglutamic acid is obtained.

Example 32

A solution of 88.2 g. of pteroylglutamic acid in 882 cc. of concentrated hydrochloric acid is diluted with 882 cc. water and cooled to 0° C. Chlorine gas is bubbled in until 32 g. is absorbed. After cooling one-half hour the thick slurry is filtered and washed with 500 cc. dilute hydrochloric acid. The cake is dissolved in one liter of concentrated hydrochloric acid, treated with activated charcoal and filtered. The filtrate is diluted with one liter of water and the mixture cooled. The precipitate is separated by filtration and washed with dilute hydrochloric acid. The cake is slurried in one liter of water, and ammonium hydroxide is added to dissolve. The solution is filtered and added slowly with stirring to 6 liters of acetone. The precipitated ammonium salt is filtered off and washed with acetone. On drying, 61 g. of 3',5'-dichloropteroylglutamic acid ammonium salt is obtained.

Example 33

A solution of 5.7 g. of pteroyl-alpha-glutamylglutamic acid (diopterin) in 57 cc. concentrated hydrochloric acid is diluted with 57 cc. water, cooled to 0° C. and treated with 1.6–1.7 g. of chlorine. The mixture is cooled overnight. The precipitate, isolated by filtration, is dissolved in 250 cc. concentrated hydrochloric acid. After the solution is treated with activated charcoal and filtered, the filtrate is diluted with 500–600 cc. water. After cooling overnight, the precipitate is filtered, washed with dilute hydrochloric acid, and dissolved in water with ammonium hydroxide. The volume is 128 cc. and is poured slowly into 1280 cc. acetone. The ammonium salt of 3',5'-dichloropteroyl-alpha-glutamylglutamic acid is filtered, washed with acetone, and dried to give 7.8 g.

Example 34

A solution of 6.86 g. of pteroyl-gamma-glutamyl-gamma-glutamylglutamic (teropterin) in 73.1 cc. of concentrated hydrochloric acid is diluted with 73.1 cc. water and cooled to 0° C. Then 1.7 g. of chlorine is bubbled in. The mixture is cooled one-half hour longer and then filtered and washed with cold dilute hydrochloric acid. The cake is dissolved in a little water with ammonium hydroxide to dissolve. The volume is 92 cc. and is added slowly to 600 cc. acetone. The sticky gum is freed of acetone by decantation and made solid by treatment with alcohol. The ammonium salt of 3',5'-dichloropteroyl-gamma-glutamyl-gamma-glutamylglutamic acid is isolated by filtration, washed with alcohol and dried; weight, 5.2 g.

Example 35

A solution of 4.4 g. real pteroylglutamic acid in 44 cc. concentrated hydrochloric acid is diluted with 44 cc. water. After warming to 30° C., 3.25 g of iodinechloride is added. After cooling overnight, the heavy precipitate is filtered, washed with dilute hydrochloric acid, and dissolved in 30 cc. concentrated hydrochloric acid. The solution is diluted with 30 cc. water and the mixture cooled and filtered. The cake is washed with dilute hydrochloric acid and slurried in 250 cc. water. To the slurry is added sodium hydroxide to about pH 1–2. The moisture is filtered and the cake washed with water. The 3',5'-diiodopteroylglutamic acid, when dry, weighed 3.2 g.

I claim:

1. Compounds having the general formula:

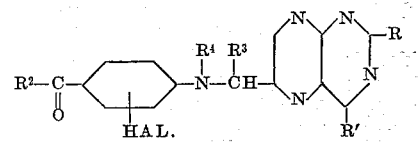

in which R and R' are members of the group consisting of hydroxyl, amino, lower alkylamino and lower dialkylamino radicals, $R^2$ is a member of the group consisting of hydroxyl and amino acid radicals, $R^3$ and $R^4$ are members of the group consisting of hydrogen and lower alkyl radicals and HAL. represents not more than two halogen radicals.

2. Compounds having the general formula:

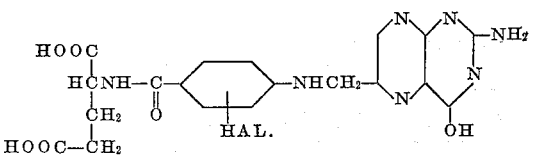

in which HAL. is not more than two halogen radicals.

3. A compound having the formula:

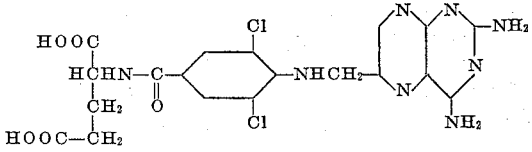

4. A compound having the formula:

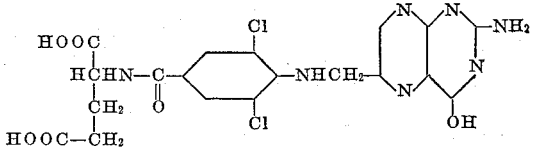

5. A compound having the formula:

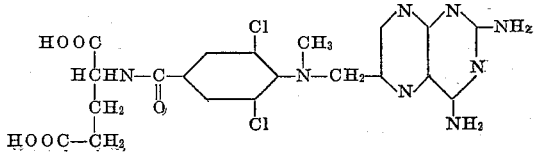

6. A compound having the formula:

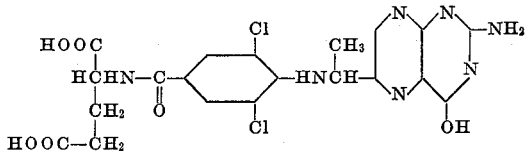

7. A compound having the formula:

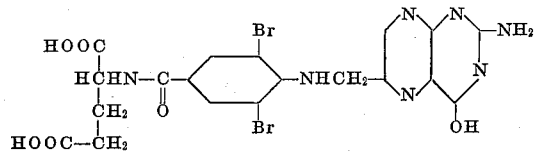

8. Compounds having the general formula:

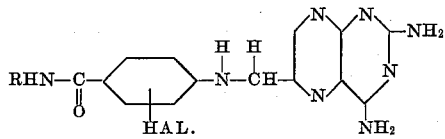

in which NHR is an amino acid radical and HAL. represents not more than two halogen radicals.

9. Compounds having the general formula:

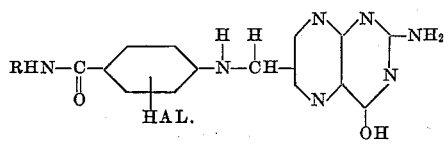

in which NHR is an amino acid radical and HAL. represents not more than two halogen radicals.

10. Compounds having the general formula:

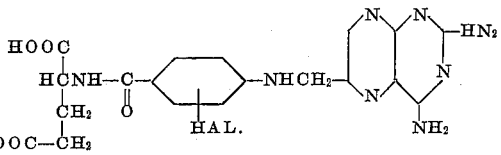

in which HAL. represents not more than two halogen radicals.

DORIS R. SEEGER.

No references cited.